United States Patent [19]
Albert

[11] Patent Number: 4,934,835
[45] Date of Patent: Jun. 19, 1990

[54] LINEAR GUIDANCE UNIT

[75] Inventor: Ernst Albert, Sand/Main, Fed. Rep. of Germany

[73] Assignee: Deutsche Star GmbH, Schweinfurt, Fed. Rep. of Germany

[21] Appl. No.: 343,068

[22] Filed: Apr. 25, 1989

[30] Foreign Application Priority Data

May 6, 1988 [DE] Fed. Rep. of Germany ....... 3815595

[51] Int. Cl.⁵ ............................................. F16C 29/06
[52] U.S. Cl. ........................................ 384/43; 384/15; 384/49; 384/50
[58] Field of Search .................. 384/15, 22, 43–45, 384/49, 50

[56] References Cited
U.S. PATENT DOCUMENTS

| | | | |
|---|---|---|---|
| 1,895,122 | 1/1933 | Benedict | 384/15 |
| 2,589,479 | 3/1952 | Curtis . | |
| 2,589,480 | 3/1952 | Curtis . | |
| 2,736,553 | 2/1956 | Brown . | |
| 2,833,597 | 5/1958 | Sloyan . | |
| 2,860,871 | 11/1958 | Schneider . | |
| 3,439,454 | 4/1969 | Stretton . | |
| 3,471,971 | 10/1969 | Richmond . | |
| 3,554,046 | 1/1971 | Kirk | 74/424.8 |
| 3,858,452 | 1/1975 | Gatland et al. | 74/89.15 |
| 4,699,521 | 10/1987 | Yokota | 384/22 X |
| 4,706,510 | 11/1987 | Zimmer | 384/15 X |

FOREIGN PATENT DOCUMENTS

| | | |
|---|---|---|
| 0033541 | 8/1981 | European Pat. Off. . |
| 0080515 | 6/1983 | European Pat. Off. . |
| 0106826 | 7/1986 | European Pat. Off. . |
| 0200694 | 12/1986 | European Pat. Off. . |
| 484006 | 10/1929 | Fed. Rep. of Germany . |
| 7024803 | 11/1970 | Fed. Rep. of Germany . |
| 2052406 | 4/1972 | Fed. Rep. of Germany . |
| 2639404 | 3/1977 | Fed. Rep. of Germany . |
| 7934780 | 4/1980 | Fed. Rep. of Germany . |
| 3013410 | 10/1981 | Fed. Rep. of Germany . |
| 2914756 | 3/1982 | Fed. Rep. of Germany . |
| 3040711 | 6/1982 | Fed. Rep. of Germany . |
| 2734530 | 7/1982 | Fed. Rep. of Germany . |
| 3205143 | 2/1984 | Fed. Rep. of Germany . |
| 3313129 | 10/1984 | Fed. Rep. of Germany . |
| 3336496 | 4/1985 | Fed. Rep. of Germany . |
| 3620571 | 12/1987 | Fed. Rep. of Germany . |
| 8715922 | 3/1988 | Fed. Rep. of Germany . |
| 1380742 | 8/1966 | France . |
| 887114 | 1/1962 | United Kingdom . |

OTHER PUBLICATIONS

Catalog NEFF Linearsystem LLS pp. 1 to 11 (no date).

Primary Examiner—Thomas R. Hannon
Attorney, Agent, or Firm—Brumbaugh, Graves, Donohue & Raymond

[57] ABSTRACT

The invention proposes a linear guidance unit in which a guide rail is mounted at the bottom of a U-shaped guide housing, a traveller being guided by means of endless ball races to move on this guide rail.

39 Claims, 7 Drawing Sheets

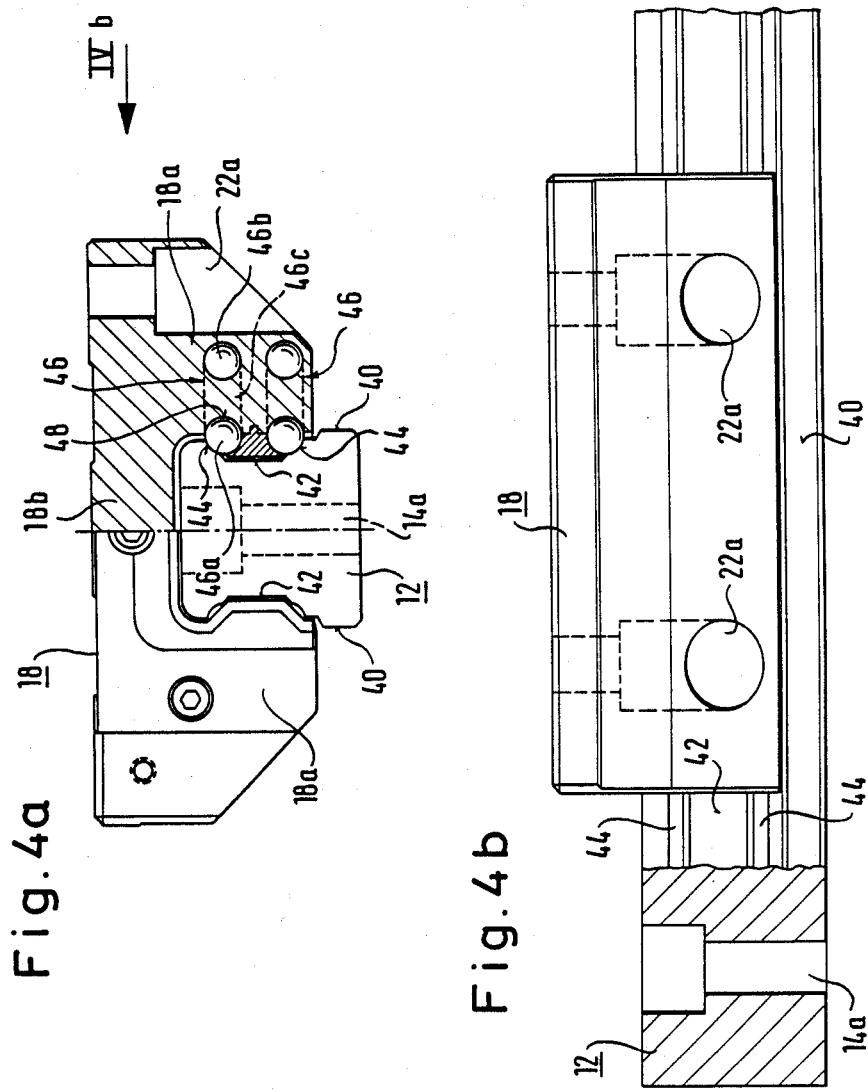

LINEAR GUIDANCE UNIT

BACKGROUND OF THE INVENTION

The invention relates to a linear guidance unit, comprising an elongated guide housing with a longitudinal axis and with, defining a guide cavity, walls, namely a bottom wall and two side walls, the two side walls forming between them, opposite the bottom wall, a longitudinal opening in the guide cavity, and further comprising an axially parallel guide rail mounted inside the guide cavity and on at least one of these walls, a traveller guided to roll on this guide rail and secured against tilting about the longitudinal axis, the said traveller being adapted to be connected through the longitudinal opening to a first connection member, and further comprising a linear drive for propelling the traveller in the direction of the longitudinal axis.

STATEMENT OF THE PRIOR ART

Such a linear guidance unit is known from DE OS No. 30 13 410. In addition, reference is made to DE OS No. 30 40 711 and DE OS No. 33 36 496.

The basic idea which the solutions mentioned as representing the state of the art have in common is that the traveller is guided to roll on the guide rail by means of rollers which are in turn mounted to rotate on axles disposed rigidly on the traveller. Obviously, this underlying thought is based on the widespread view that the rollers mounted on the traveller are enclosed by the guide housing so that the rollers require no special encapsulation, which means that the rollers can easily be mounted on a simply shaped traveller, in a so to speak open fashion.

For many years, it has furthermore been known for the linear guidance of a traveller to dispose rolling bearing races between the traveller and a guide rail, each of these rolling bearing races comprising a rectilinear load-transmitting row of rolling bearings engaging an axially parallel load-receiving track in the traveller and an axially parallel load-receiving track in the guide rail and furthermore a return row of rolling bearings and two arcuate rows of rolling bearings. This prior art construction necessarily leads to an encapsulation of the rolling bearing races between the traveller and the guide rail and is therefore used whenever no other kind of encapsulation is provided or is feasible, i.e. whenever the traveller runs in exposed fashion on the guide rail.

In addition, European published specification No. 106 826 also disclosed linear guides in which the traveller driven by a spindle drive is guided inside the guide housing by plain linear bearings on profile guide strips within the guide housing, these profile guide strips being coated with a wear-resistant coating and in that there are mounted on the traveller guide sleeves guided in sliding fashion on and partially engaging around the guide profile strips.

SUMMARY OF THE INVENTION

The invention proposes a construction which basically diverges from the state of the art in that there are in the traveller which partially engages around the guide rail at least two rolling bearing races, each of which comprises a load-transmitting rectilinear row of rolling bearings engaging an axially parallel load-receiving track in the traveller and an axially parallel load-receiving track in the guide rail and, furthermore, a return row of rolling bearings and two arcuate rows of rolling bearings.

According to the invention, therefore, the principle of the rolling bearing races encapsulated between traveller and guide rail and which was hitherto employed in the case of linear guides which were otherwise not enclosed, was for the first time applied to the case of a linear guide in which a guide housing already satisfies the condition of the rolling parts being enclosed. This additional complication, which at first sight appears to be hardly justified, has been demonstrated to have been just that:

In contrast to the previously known solutions according to DE OS No. 30 13 410 and DE OS No. 30 40 711 there is the advantage that a far greater resistance on the part of the traveller against tilting about the longitudinal axis of the guide housing is achieved because the axles mounted at one end on the traveller and carrying the rollers in the case of these known solutions are no longer fitted. Further contributory factors in the increased rigidity are the large number of rolling bearings and therefore contact points between guide rail and traveller, the rolling bearings and the tracks being very closely adjacent one another. This also leads to a markedly higher bearing capacity, torque-loading capacity and therefore effective life than in the case of the previously known solutions. In addition, the guide rails and travellers which are used are commercially available standard components which, being of a simple design, can easily be accommodated in the relevant guide housing so that the expense which at first seems to be substantial is in practice reduced to a tolerable level.

Compared with the solution disclosed in DE OS No. 33 36 496, in which rollers are likewise mounted on the traveller but on one side only, these rollers rolling directly on profile surfaces of the guide housing, the solution according to the invention affords the additional advantage that the working surfaces for the rolling bearings on the guide housing can without difficulty be produced from a hardenable material due to the fact that the guide rail is separate from the guide housing whereas the rolling tracks constructed on the actual guide housing, in accordance with the state of the art, could either not be hardened at all or were hardenable only at considerable expense. If they were not hardened, then after a short period of use the rollers would work their way into the material of the tracks, so adversely affecting the smooth running and accuracy of movement.

In comparison with the generically different solution according to European published specification No. 106 826, there is the advantage of far greater accuracy of guidance, bearing in mind that in the prior art, due to the fact that the guide rails are in one piece with the guide housing, it was necessary to accept considerable inaccuracy in manufacture resulting in considerable clearance and this sharply reduced the accuracy of positioning and movement without its being possible to avoid the danger of seizure. Even the provision of hardened bearing surfaces on the guide rails failed to overcome these disadvantages, since these bearing surfaces could only be provided with the necessary accuracy with difficulty and at considerable cost.

In the case of the solution according to the invention, the use of a clearance-free or even initially tensioned linear bearing makes for a considerable loading capacity on the part of the traveller, which is identical to the movable part of the linear guidance system, both in its axial direction and also in its tilting direction. This smoothly-running unit can be fitted easily and accurately in the guide housing by means of screws. The result is a high accuracy of positioning at a justifiable cost for the linear drive and without adversely affecting this accuracy of positioning, it is possible to select high travelling speeds such as are required particularly when constructing machine tools and handling equipment, but also for applications such as garage door drives, windscreen wiper drives and the like.

A particularly high rigidity of the traveller against rotation about the longitudinal axis of the guide housing or tilting axes which are parallel therewith can be achieved in that on two almost mutually parallel side faces of the guide rail which are approximately at right-angles to the wall carrying the guide rail, there are in each case two load-receiving track rows of rolling bearings in the altogether four rolling bearing races.

Standard production elements are also available for such an arrangement of rolling bearing races. As is known from DE OS No. 36 20 571, it is from the point of view of resistance to tilting particularly favourable if the tracks of the guide rail which are on one and the same side of the guide rail are formed on the flanks of in each case an axially parallel longitudinal groove machined into the relevant side face of the guide rail.

For the rest, the structural features according to DE OS No. 36 20 571 can all be applied in the solution according to the invention. However, this is not intended to mean that only rolling bearing races according to DE OS No. 36 20 571 can be used for the solution according to the invention.

The traveller may basically be U-shaped, its web resting on that side of the guide rail which is remote from the fixing point while its arms bear on those side faces of the guide rail which are substantially at right-angles to the bearing wall of the guide housing. This means that the traveller according to DE OS No. 36 20 571 can be used substantially without modification. This advantageous result could not be foreseen because during development of the element according to DE OS No. 36 20 571, there was no thought of developing a linear guide with a guide housing.

A solution which is suitable for a multiplicity of applications is possible if the guide rail is disposed on the inside of the bottom wall and if the traveller is in the region of a connecting face which is remote from the bottom wall provided with connecting means for connection to the first connection member. However, this is not intended to exclude the possibility of the guide rail also, for specific applications, being occasionally fitted on a side wall if, in special cases, this is regarded as advantageous to the flow of the guidance forces.

For the versatility of use of the linear guidance unit according to the invention, it is furthermore advantageous if the guide housing is of substantially symmetrical construction, in respect of a plane of symmetry which is at right-angles to the bottom wall and which contains its longitudinal axis, and if the traveller is likewise substantially symmetrical in construction in relation to this plane of symmetry. As a rule, this solution also implies a corresponding symmetrical design of guide rail.

So that the guide rail can enjoy versatile use without further adaptation and can easily be fixed in whichever installation environment is involved, it is suggested that the walls of the guide housing have on their outer surfaces which are remote from the guide cavity connection means for connection to a second connection member. This possibility is in itself known from German published specifications Nos. 30 13 410, 30 40 711 and 33 36 496. As known from the said specifications, the connecting means may be undercut T-shaped grooves which extend parallel with the longitudinal axis of the guide housing.

In consideration of simple and economic manufacture of the guide housing, it is suggested that it be produced as an extruded section, particularly an extruded light metal section, as is likewise known from published specifications Nos. 30 13 410, 30 40 711 and 33 36 496.

In order to retain precision and guidance and smoothness of movement over a prolonged working time, it is suggested that the guide rail be a steel rail. In this case, the guide rail can easily be hardened.

The guide rail may be connected to the relevant wall by being clamped or screwed, the guide rail possibly being fixed to the relevant wall by screwed bolts which pass through the wall concerned and have abutment means which bear on the outside face of that wall.

If for the reasons mentioned above the guide housing and the guide rail consist of different materials, then it is recommended that the abutment means consist of an abutment rail which extends substantially over the length of the guide rail. This means that the guide rail which is of steel, on the other side of the wall which is produced for example from light metal, is in turn opposite an abutment rail which consists of steel, so that bimetallic effects are avoided.

In order to be able to use a traveller which is available as a standard component while being able at the same time to adapt the traveller assembly as a whole to whatever is the format of guide housing used, it is suggested that on the connecting face of the traveller which is remote from the bottom wall there is a connecting member which is of substantially T-shaped cross-section at right-angles to the longitudinal axis, being intended for fixing the first connection member, the said connecting member having its middle web fixed to the traveller while its transverse arms are closely adjacent the end faces of the side walls which are remote from the bottom wall. In this way, it is possible to offer a large base for connection of the first connection member.

For the linear drive, various possibilities are available:

A spindle drive such as is known for instance from European published specification No. 106 826, a ball and worm drive such as is known for example from DE OS No. 29 14 756, chain and belt drives such as are known for example from U.S. Pat. Ser. No. 2,736,553 or DE OS No. 33 36 496 and rack transmissions such as are known from DE OS No. 30 13 410.

According to a first preferred embodiment, it is envisaged that the linear drive consist of a flexible traction means which, starting from the traveller, passes over a jockey pulley at each of the two ends of the guide housing and back to the traveller.

In this respect, it is recommended that for the sake of easier assembly, the flexible traction means should be open, its two ends being attached to the traveller, as is known from U.S. Pat. Ser. No. 2,736,553 and DE OS No. 33 36 496.

Whereas according to the state of the art (U.S. Pat. Ser. No. 2,736,553 and DE OS No. 33 36 496) the flexible traction means is housed completely inside the guide cavity, it is according to the invention suggested that the middle strand of the flexible traction means which extends from jockey pulley to jockey pulley and which is not connected to the traveller extends outside the guide cavity. As a result of this development, a possibility of favourably accommodating and fixing the guide rail inside the guide cavity is afforded, something which is not required in the state of the art (U.S. Pat. Ser. No. 2,736,553 and DE OS No. 33 36 496) because no such rail is provided.

In order nevertheless to be able to accommodate the middle strand of the flexible traction means in the protected space, it is suggested that the middle strand extends through a middle strand receiving chamber of the guide housing which extends on the longitudinal axis.

On manufacturing grounds, but particularly with a view to easy attachment of abutments for securing the guide rail, it is recommended that the middle strand receiving chamber has an opening in the direction of the outer space which encloses the guide housing.

Where such an opening is provided, in order nevertheless to ensure that the middle strand of the flexible traction means remains inaccessible, it is suggested that the opening in the middle chamber receiving unit is closed by a cover.

From the point of view of manufacture, it is advantageous if the cover is retained in cover holding grooves in the guide housing.

If the guide rail is mounted on the inside face of the bottom wall, this means that the middle strand of the flexible traction means extends on the outer surface of the bottom wall which is remote from the guide cavity.

In the edge areas of this outer surface, there will then always be sufficient space for the bottom wall to be capable of being connected to a second connection member, in other words there will be substantially space for undercut T-shaped grooves.

Where the linear guidance unit is of considerable length, in order to suppress oscillation of the flexible traction means and so avoid inaccuracies in positioning, it is suggested that the profile strips engage at least partially around the edges of the portions of the flexible traction means extending between the traveller and the jockey pulleys, and which are spaced apart in the axial direction off these latter.

If the guide rail is on the bottom wall and if the flexible traction means is disposed symmetrically in relation to the longitudinal central plane through the guide housing, as known per se from U.S. Pat. Ser. No. 2,726,553 and DE OS No. 33 36 496, then the profile strips on the side walls of the guide housing will be disposed so that they face each other in the region of the longitudinal aperture. With regard to the capacity for combining different traction means with one and the same guide housing, it is recommended that the profile strips be manufactured particularly from synthetic plastics material and separately from the guide housing and then be mounted on the guide housing; for various combinations, then, it is necessary only for the profile strips to be exchanged while the guide housing remains the same.

A shape of profile strip which is favourable for the guidance function and likewise for simple attachment on the guide housing is made possible if the profile strips have an H-shaped cross-section, one groove of the H engaging around a longitudinal edge of the flexible traction means while the legs defining the other groove of the H-shaped cross-section have corresponding marginal beads which engage in T-shaped grooves in the guide housing.

Alternatively, the flexible traction means can take the form of a chain or toothed belt. Both possibilities are known from both U.S. Pat. Ser. No. 2,736,553 as well as from DE OS No. 33 36 496. The jockey pulleys are adapted to suit whichever type of traction means is used.

In order that accommodation of the jockey pulleys should require the fewest possible interventions into the guide housing, it is recommended that at least one of the jockey pulleys be accommodated in a jockey pulley housing which is disposed on an end surface of the guide housing which is substantially at right-angles to the longitudinal axis. Also this further development is known from U.S. Pat. Ser. No. 2 736 553 and DE OS No. 33 36 496.

So that it is nevertheless possible to mount the guide housing also in the region of the jockey pulley housing, it is suggested that this latter, viewed in its cross-section at right-angles to the longitudinal axis of the guide housing, be of substantially the same cross-section as the outer contours of the guide housing. In particular, any T-shaped grooves which serve for mounting of a connection member can be continued in the region of the jockey pulley housing.

In order to be able to adjust the tension of the flexible traction means, in accordance with corresponding prior art proposals which emerge from U.S. Pat. Ser. No. 2,736,553 and DE OS No. 33 36 496, at least one jockey pulley is adapted to be adjustable in the direction of its longitudinal axis.

In order to prevent dirt penetrating the guide housing, it is suggested that at the junction between the guide housing and the jockey pulley housing, in the region of the longitudinal aperture in the guide housing, a gasket should be provided which co-operates with the flexible traction means. The fitment of sealing means is indeed known per se from GB Pat. Ser. No. 887 114 and DE OS No. 33 36 496. In this case, the sealing means are however provided on the longitudinal edges of the longitudinal aperture. It has been found that the critical point in providing a protective seal is where the flexible deflecting means (sic!) enters the respective jockey pulley housing, so encouraging the ingress of dirt.

In order to provide the greatest possible safeguard against contact for the middle strand of the flexible traction means on its path to the reversing or jockey pulleys, it is suggested that at least one end of the middle strand receiving chamber opens out into the interior of a jockey pulley housing.

As an alternative to the linear drive, it is proposed that the drive consist of a ball and worm drive with, extending in the longitudinal direction of the guide housing, a spindle connected to a rotary drive and mounted in axially rigid and rotatable manner on the guide housing, and with, mounted on the traveller, a nut body comprising an inner helical groove supplemented by a spindle to constitute a helical ball race and holding a number of endlessly rotating balls, a substantially axially extending ball return race being housed in the nut body. With regard to the construction of a ball and worm drive, reference is made particularly to DE OS No. 29 14 756. The use of such a ball and worm drive makes for especially favourable smoothness of movement and accuracy of positioning. The ball and worm drive requires a considerably larger accommodation cross-section within the guide housing. However, it has been demonstrated that in the case of an embodiment according to the invention where the guide rail is mounted on the bottom wall and the traveller which engages around this in a U-shape, there is above the guide rail and the traveller for the usual cross-sections of guide housing, adequate space to accommodate a ball and spindle drive, due to the fact that there are no further linear guide elements to be accommodated, accommodation of the nut body, particularly a connecting member which may possibly be connected to the actual traveller may be used and may project beyond the guide cavity so that possibly also the nut body may project beyond the guide cavity and through the longitudinal opening.

The attached drawings illustrate the invention with reference to an example of embodiment. In the drawings:

BRIEF DESCRIPTION OF THE DRAWINGS

FIG. 4a shows a cross-section through the guide rail and the traveller;

FIG. 4b is a view of FIG. 4a in the direction of the arrow IV b;

DESCRIPTION OF THE PREFERRED EMBODIMENTS

Figure 1:
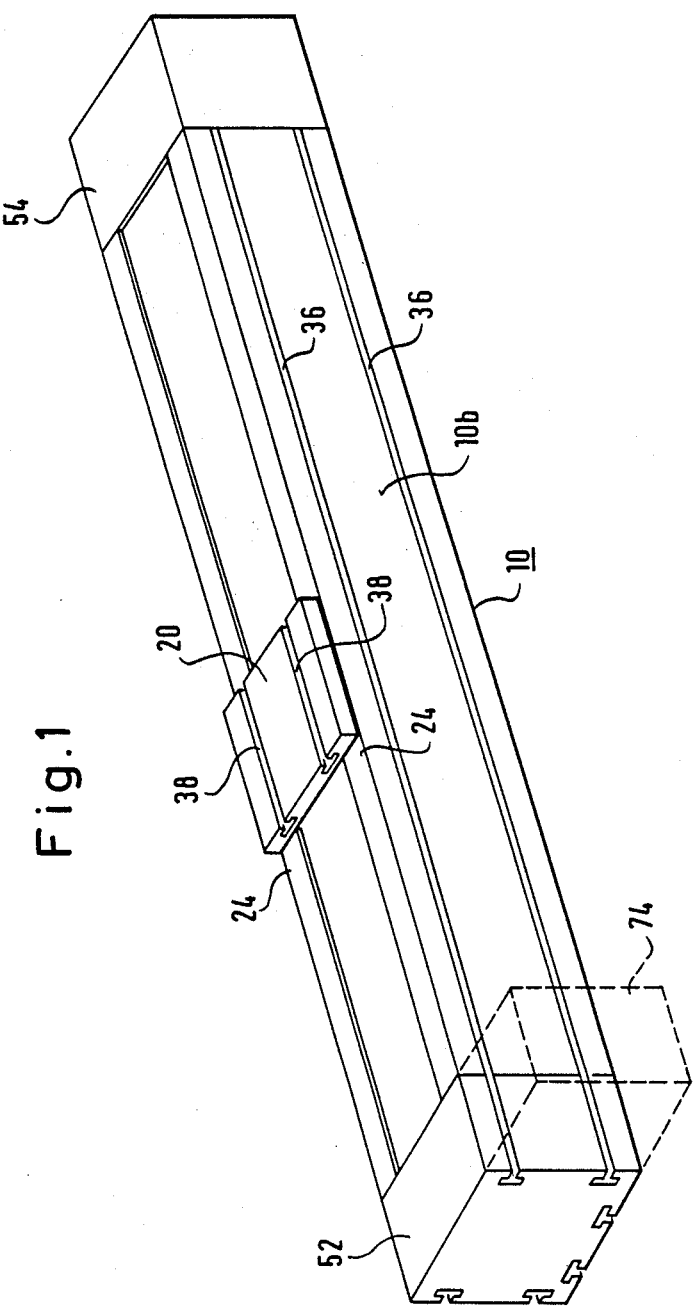
FIG. 1 is a perspective view of a linear guidance unit according to the invention.
Figure 7:
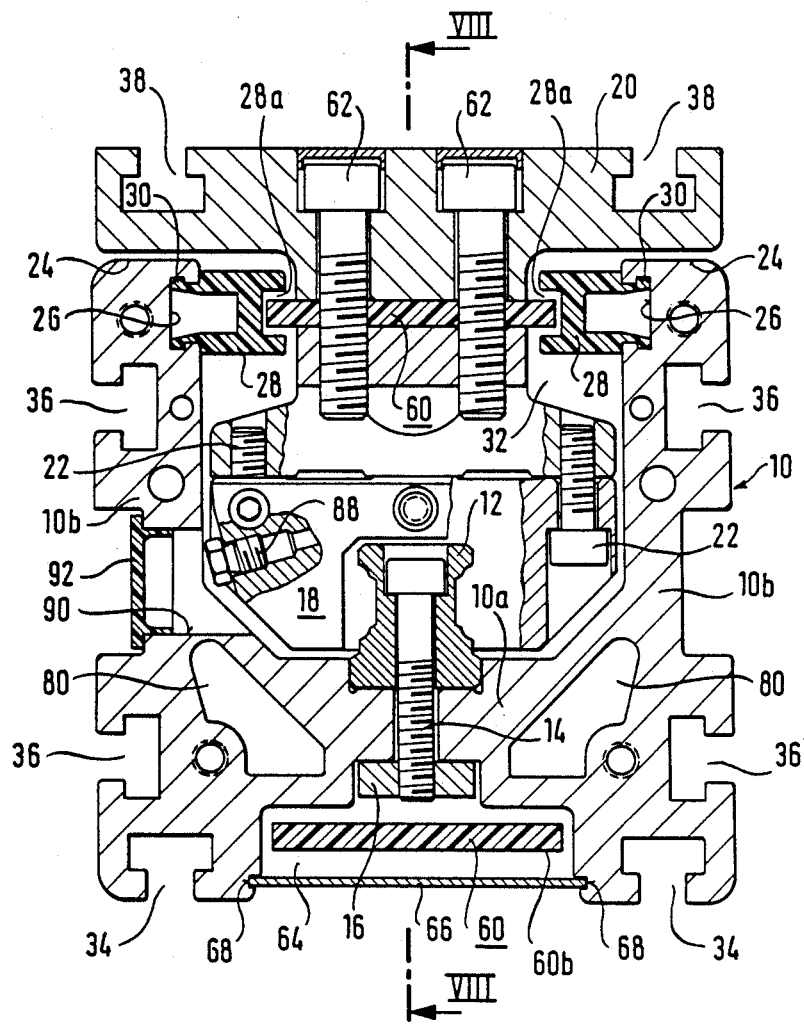
FIG. 7 is an overall cross-section through the completely assembled linear guidance unit.
Figure 8:
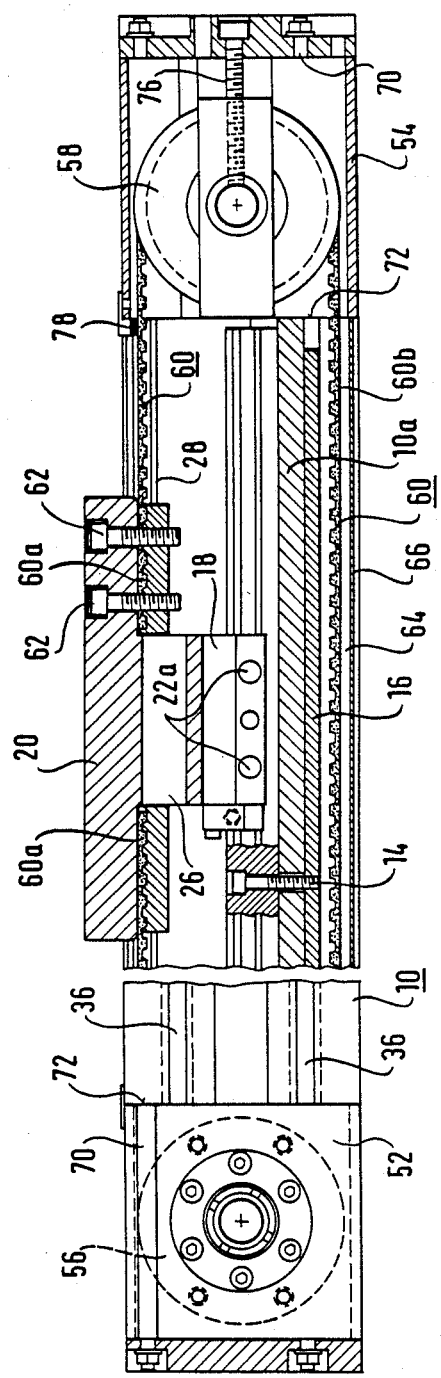
FIG. 8 shows a longitudinal section taken on the line VIII—VIII in FIG. 7.

Reference is made firstly to the view shown in FIGS. 1, 7 and 8. A guide housing is designated 10. This guide housing 10 can be seen particularly in FIG. 7. The guide housing 10 comprises a bottom wall 10a and two side walls 10b. Mounted on the inside surface of the bottom wall 10a is a guide rail 12 which is secured by bolts 14 which pass through the bottom wall 10a and are screwed to an abutment rail 16. Guided for displacement on the guide rail 12 is a traveller 18. The method of guidance will be dealt with later. Secured by screwed bolts 22 to the traveller 18 is a connecting member 20 which is T-shaped, projecting beyond the end faces 24 of the side walls 10b. Provided on the inside faces of the side walls 10b are undercut T-shaped grooves 26 in which H-shaped profile strips 28 engage by means of longitudinal beads 30. Formed inside the guide housing 10 is a guide cavity 32 which houses the traveller 18 and a part of the connecting member 20. Provided on the outer surfaces of the bottom wall 10a and the side walls 10b are T-shaped grooves 34 and 36 which serve to mount the guide housing 10 on a basic structure. Provided in the connecting member 20 are grooves 38 which are also of T-shaped cross-section and which serve to connect the connecting member 20 to a part (not shown) which exercises a guiding function in relation to the structure, and which is sometimes referred to herein as the first connection member.

With regard to the way the traveller 18 is guided on the guide rail 12, reference is now made to FIGS. 4a and 4b. In each of its two side faces 40, the guide rail 12 has a groove 42 on the flanks of which there are load-receiving tracks 44 on the guide rail 12. Altogether four ball races 46 are provided in the traveller 18. Each ball race 46 consists of a row of load-transmitting balls 46a, a row of returning balls 46b and two arcuate rows of balls 46c. The load-transmitting row of balls 46a engages the load-receiving track 44 on the guide rail 10 and a load-receiving track 48 in the traveller 18. The returning row of balls 46b and the arcuate rows of balls 46c are guided within the arms 18a of the traveller 18. For more detailed information, reference is made to DE OS No. 36 20 571. The traveller 18 is guided on the guide rail 12 via the ball races 46. Upon a displacement of the traveller 18 along the guide rail 12, the balls of the ball races revolve in a closed loop. By reason of the position of the load-transmitting tracks 44 and 48 of the guide rail 12 or traveller 18, as indicated in FIG. 4a, the traveller is secured against tilting in the plane of FIG. 4a, in that it has a high resistance to tilt. The arms 18a of the traveller are connected in flexurally rigid manner by the web 18b of the traveller. FIGS. 4a and 4b show on the traveller 18 stepped bores 22a to accommodate the fixing bolts 22 which establish the connection to the connecting member 20.

Furthermore, FIGS. 4a and 4b show bores 14a which accommodate the bolts 14 which fix the guide rail 12 according to FIG. 1 to the bottom wall 10a.

The traveller 18 is capable of being driven by a linear drive. As FIGS. 1 and 8 show, jockey pulley housings 52 and 54 are provided at the ends of the guide housing 10. The reversing or jockey pulleys 56 and 58 are rotatably mounted in these housings. Running over the jockey pulleys 56 and 58 is a toothed belt 60, the ends 60a of which are anchored on the connecting member 20 by means of anchoring screws 62. The edges of the end portions 60a of the toothed belt 60 are, as FIG. 7 shows, guided in grooves 20a in the H-shaped profile strips 28. The middle strand 60b of the toothed belt 60 which is remote from the traveller 18 extends between the two jockey pulleys 56 and 58 in a middle strand housing chamber 64 in the bottom wall 10a. This middle strand receiving chamber 64 is closed by a cover 66 which is secured in cover-retaining grooves 68 in the bottom wall 10a. As FIG. 8 shows, the middle strand receiving chamber 64 is open towards the interiors of the jockey pulley housings 52 and 54 so that the middle strand 60b of the toothed belt 60 is fully enclosed over its entire length. The jockey pulley housings 52 and 54 are anchored in the end faces 72 of the guide housing 10 by clamping bolts 70. As FIG. 1 shows, there is flanged onto the jockey pulley housing 52 a housing 74 of a drive unit which carries a stepping motor for the jockey pulley 56.

By means of the clamping bolt 76, the jockey pulley 58 can be adjusted in order to maintain the toothed belt 60 at tension. A sealing element 78 can be seen at the point where the toothed belt 60 enters the jockey pulley housing 54.

Figure 2:
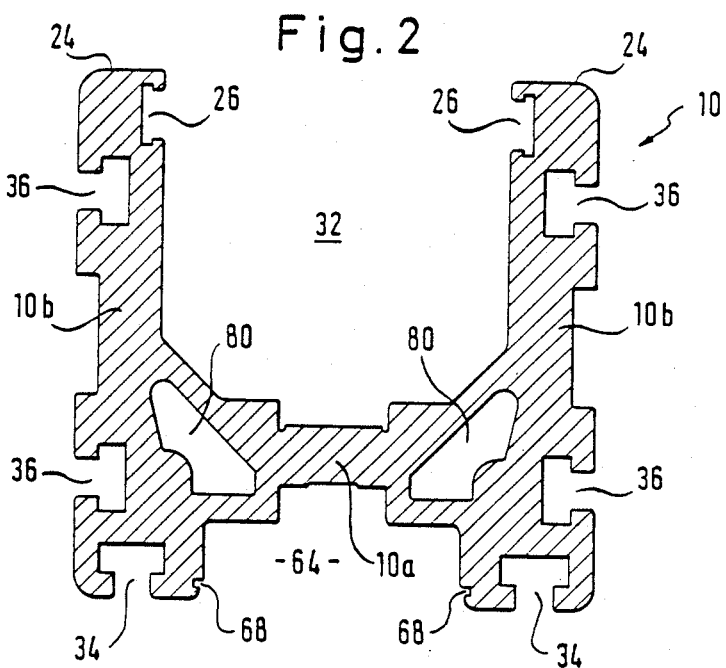
FIG. 2 is a cross-section through the guide housing.

The purpose of the cavities 80 shown in FIG. 2 is to save weight.

Figure 3A:
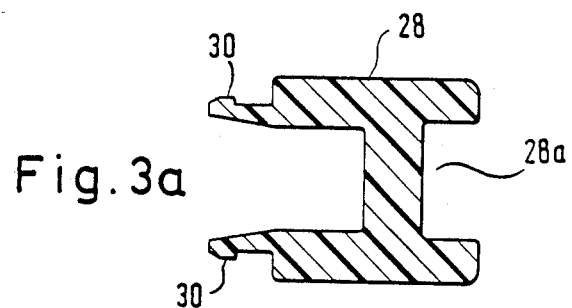
FIG. 3a is a cross-section through a profile strip for guiding a flexible traction means.
Figure 3B:
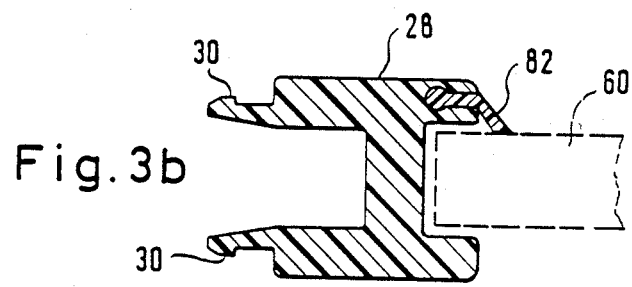
FIG. 3b is a modified embodiment in relation to FIG. 3a, in a corresponding cross-section.
Figure 5:
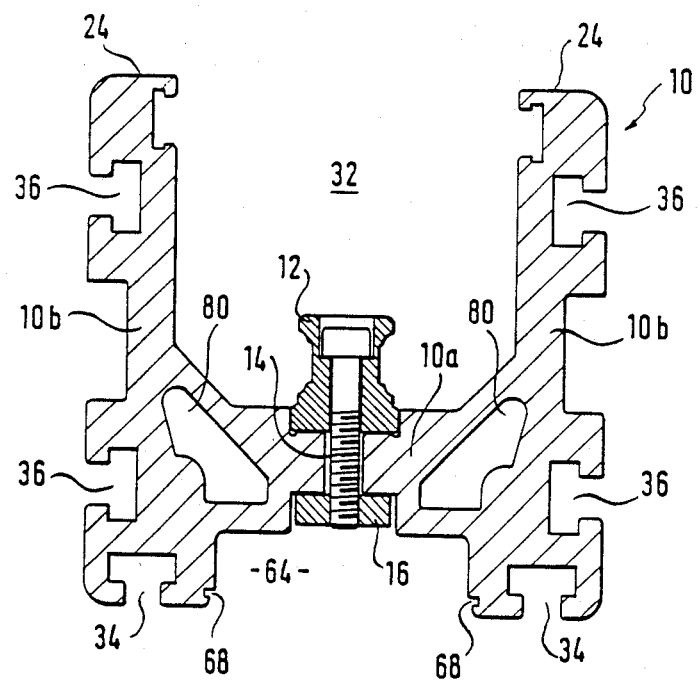
FIG. 5 shows a cross-section through the guide housing with the guide rail mounted in place.
Figure 6:
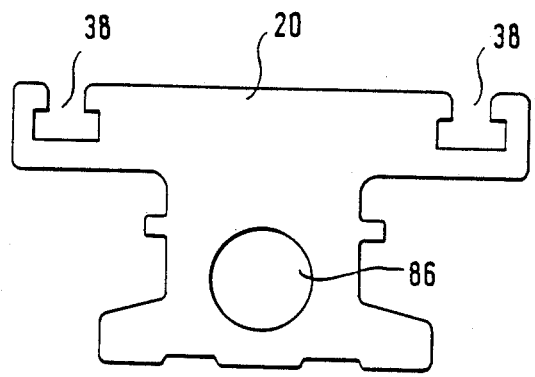
FIG. 6 is an end view of a connecting member for mounting on the traveller.

FIG. 3b shows that sealing strips 82 can still be provided on the profile strips 28 and bear on the toothed belt 60. The bore 86 in the connecting member 20 as shown in FIG. 6 serves as a means of saving on weight. FIG. 7 shows a lubricating nipple 88 for lubricating the ball races in FIG. 4a. This lubricating nipple 88 can be made accessible through an opening 90 in a side wall 10b once the cover 92 has been removed.

Figure 9:
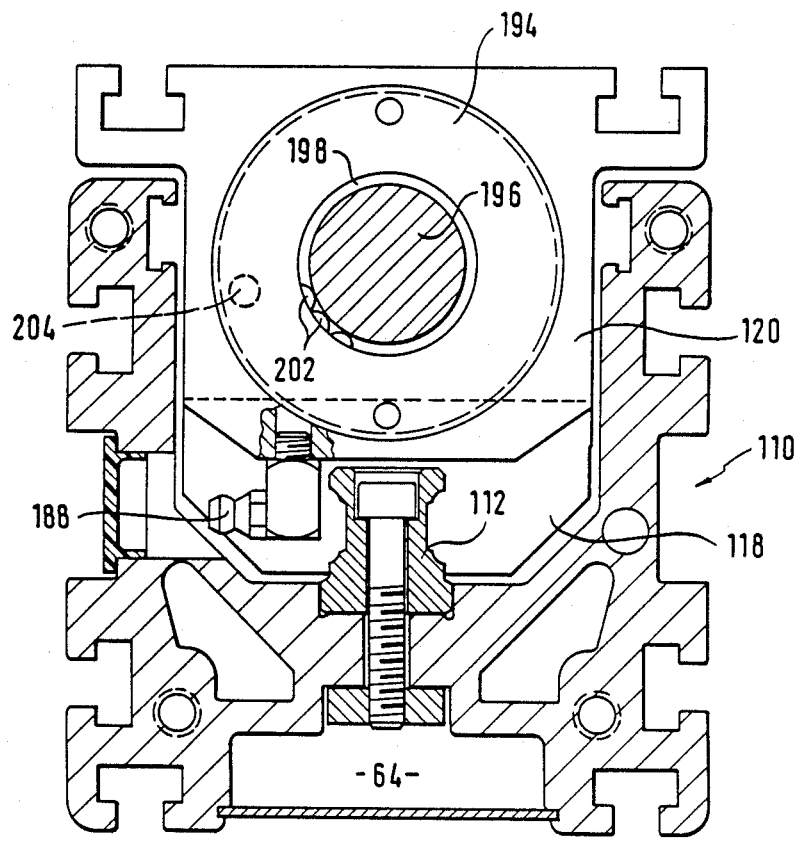
FIG. 9 shows a cross-section through a modified embodiment.

FIG. 9 shows a modified embodiment. The guide housing 110 is constructed in exactly the same way as in FIG. 7. Here, too, the traveller 118 is guided on a guide rail 112. Although a toothed belt is not provided, the illustration shows the middle strand receiving chamber 64 so that the guide housing can as required be used for the embodiment in FIG. 7 or 8. A nut body 194 of a ball and worm drive is housed in the connecting member 120. Screw threads are constructed in this nut body 194 and a threaded spindle 196 is accommodated in the nut body 194. The screw threads in the nut body 194 and in the threaded spindle 196 form a ball passage 198. This passage 198 houses balls 202. The balls 202 form an endless ball loop, the ends of the ball passage formed by the threads being connected by a return passage 204. Details of this ball and worm drive are for example disclosed in DE Pat. Ser. No. 29 14 756. The nut body 194 is rigidly connected to the traveller 118. The screw-threaded spindle 196 is at its ends rotatably but axially immovably mounted in end walls of the guide housing 110 and is connected to a rotary drive, particularly a geared motor. The lubricating nipple 188 in this case, too, serves for lubricating the ball and worm drive. For the rest, the embodiment shown in FIG. 9 corresponds to that shown in FIGS. 1 to 8.

What is claimed is:

1. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), an axially parallel guide rail (12) mounted inside the guide cavity (32) and secured to at least one of said walls (10a, 10b), a traveller (18) guided to roll on the guide rail (12) and secured against tilting about the longitudinal axis, said traveller (18) being adapted to be connected through the longitudinal opening to a first connection member, a linear drive means for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings engaging an axially parallel load-receiving track (48) in the traveller (18) and an axially parallel load-receiving track (44) in the guide rail (12) and a return row (46b) of rolling bearings and two arcuate rows (46c) of rolling bearings, means for securing said guide rail (12) to said at least one wall (10a, 10b) including an abutment rail (16) extending along substantially the total length of said guide rail (12) on the side of said at least one wall (10a, 10b) remote from said guide rail (12), and means for securing said abutment rail (16) to said guide rail (12) with said abutment rail (16) in engagement with an abutment face on said remote side of said at least one wall (10a, 10b), said guide rail (12) and said abutment rail (16) being made of materials having substantially the same thermal expansion properties to minimize bimetallic effects therebetween, said at least one wall (10a, 10b) being made of a material having thermal expansion properties different from those of the guide rail (12) and the abutment rail (16).

2. A linear guidance unit according to claim 1, characterized in that the traveller (18) is basically U-shaped, its web (18b) resting on that side of the guide rail (12) which is remote from at least one wall (10a) and its arms (18a) bearing on the side faces (40) of the guide rail (12) which are substantially at right-angles to said at least one wall (10a) of the guide housing (10).

3. A linear guidance unit according to claim 1, characterized in that the guide rail (12) is secured to said at least one wall (10a) by screwed bolts which traverse said at least one wall (10a) and have abutment means (16) on the outside of the abutment rail (16).

4. A linear guidance unit according to claim 1, characterised in that the linear drive means comprises a flexible traction means (60) which, starting from the traveller (18), passes over jockey pulleys (56, 58) in the region of each of the two ends of the guide housing (10) and back to the traveller.

5. A linear guidance unit according to claim 4, characterised in that the flexible traction means (60) is open and has its two ends fixed to the traveller (18).

6. A linear guidance unit according to claim 4, characterised in that the middle strand (60b) of the flexible traction means (60) which extends from jockey pulley to jockey pulley and which is not connected to the traveller (18) extends outside the guide cavity (32).

7. A linear guidance unit according to claim 6, characterised in that the middle strand (60b) extends through a middle strand receiving chamber (64) of the guide housing (10) which extends parallel to the longitudinal axis.

8. A linear guidance unit according to claim 7, characterised in that, at least at one end, the middle strand receiving chamber (64) opens out into the interior of a jockey pulley housing (52, 54).

9. A linear guidance unit according to claim 7 characterized in that the middle stand receiving chamber (64) has an opening facing away from the guide cavity (32).

10. A linear guidance unit according to claim 9, characterised in that the opening in the middle strand receiving chamber (64) is closed by a cover (66).

11. A linear guidance unit according to claim 10, characterised in that the cover (66) is accommodated in cover-retaining grooves (68) in the guide housing (10).

12. A linear guidance unit according to claim 4, characterised in that if the guide rail (12) is disposed on the inner surface of the bottom wall (10a), and the middle strand (60b) of the flexible traction means (60) extends on that outer face of the bottom wall (10a) which is remote from the guide cavity (32).

13. A linear guidance unit according to claim 4, characterized in that profile strips (28) engage at least partially around edges of the portions (60a) of the flexible traction means (60), said edges extending axially between the traveller (18) and the jockey pulleys (56, 58) and being spaced apart in the axial direction of the jockey pulleys (56, 58).

14. A linear guidance unit according to claim 13, characterised in that the profile strips (28) are disposed on the side walls (10b) of the guide housing (10) in the region of the longitudinal opening and point towards each other.

15. A linear guidance unit according to claim 13, characterized in that the profile strips (28) are composed of synthetic plastic materials and are separate from the guide housing (10).

16. A linear guidance unit according to claim 15, characterised in that the profile strips (28) have an H- shaped profile cross-section, one groove (28a) of the H-shaped profile engaging around a longitudinal edge of the flexible traction means (60) while the flanges which define the other H-profile groove have appropriate marginal beads (30) which engage in T-shaped grooves (26) in the guide housing (10).

17. A linear guidance unit according to claim 4, characterised in that the flexible traction means (60) is constructed as a toothed belt.

18. A linear guidance unit according to claim 4, characterised in that at least one of the jockey pulleys (56, 58) is accommodated in a jockey pulley housing (52, 54) which is disposed on an end face (72) of the guide housing (10) which is substantially at right-angles to the longitudinal axis.

19. A linear guidance unit according to claim 18, characterised in that the jockey pulley housing (52, 54), viewed in its cross-section at right-angles to the longitudinal axis of the guide housing (10), is of substantially the same cross-section as the outer contours of the guide housing (10).

20. A linear guidance unit according to claim 18, characterised in that a drive unit is fixed on at least one jockey pulley housing (52, 54).

21. A linear guidance unit according to claim 18, characterised in that, at the junction between the guide housing (10) and the jockey pulley housing (52, 54), there, is in the region of the longitudinal opening in the guide housing (10) a gasket (78) which co-operates with the flexible traction means (60).

22. A linear guidance unit according to claim 4, characterised in that at least one (58) of the jockey pulleys (56, 58) is adjustable in the direction of the longitudinal axis.

23. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), and further comprising an axially parallel guide rail (12) mounted inside the guide cavity (32) and on at least one of these walls (10a, 10b), a traveller (18) guided to roll on the guide rail (12) and secured against tilting about the longitudinal axis, said traveller (18) being adapted to be connected through the longitudinal opening to a first connection member, linear drive means for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings engaging an axially parallel load-receiving track (48) in the traveller (18) and an axially parallel load-receiving track (44) in the guide rail (12) and a return row (46b) of rolling bearings and two arcuate rows (46c) of rolling bearings, said linear drive means comprising a ball and worm drive (194, 196) with, extending in the longitudinal direction of the guide housing (110), a spindle (196) connected to a rotary drive and mounted in an axially rigid and rotatable manner on the guide housing (10), and with, mounted on the traveller (18), a nut body (194) comprising an inner helical groove supplemented by the spindle (196) to constitute a helical ball race (198) and holding a number of endlessly rotating balls (202), a substantially axially extending ball return race (204) being housed in the nut body (194), said traveller (118) comprising a web (18b) and two arms (18a) integrally combined therewith in a U-shaped manner, said web (18b) and said arms (18a) being adjacent to axially extending side faces of said guide rail (112), a connecting member (120) being separate from and fastened to said traveller (118) adjacent a side face of said web (18b) remote from said guide rail (112), said nut body (194) being accommodated within said connecting member (120) being at least partially accommodated within said guide cavity (32), and being adapted for connecting said first connection member with said traveller (118).

24. A linear guidance unit according to claim 1 or claim 23 characterised in that two load-receiving tracks (44) of the guide rail (12) for the rows (46a) of load-transmitting rolling bearings of a total of four rolling bearing races (46) are disposed on each of two approximately parallel side faces (40) of the guide rail (12) which are substantially at right-angles to the wall (10a) which carries the guide rail (12).

25. A linear guidance unit according to claim 24, characterised in that the tracks (24) of the guide rail (12) which are situated on one and the same side (40) of the guide rail (12) are formed on the flanks of in each case an axially parallel longitudinal groove (42) machined into the relevant side face (40) of the guide rail (12).

26. A linear guidance unit according to claim 1 or claim 23, characterised in that in respect of a plane of symmetry which is at right-angles to the bottom wall (10a) and which contains its longitudinal axis, the guide housing (10) is of substantially symmetrical construction, the traveller (18) being likewise substantially symmetrical in construction in respect of this plane of symmetry.

27. A linear guidance unit according to claim 1 or claim 23, characterised in that the walls (10a, 10b) of the guide housing (10) have on their outer surfaces which are remote from the guide cavity (32) connection means (34, 36) for connection to a second connection member.

28. A linear guidance unit according to claim 27, characterised in that the connection means are undercut T-shaped grooves (34, 36, 38) which extend parallel with the longitudinal axis of the guide housing.

29. A linear guidance unit according to claim 1 or claim 23, characterized in that the guide housing (10) comprises an extruded light metal section.

30. A linear guidance unit according to claim 1 or claim 23, characterised in that the guide rail (12) is a steel rail.

31. A linear guidance unit according to claim 1 or claim 23, characterized in that the guide rail (12) is connected to said at least one wall (10a) by means selected from the group consisting of screwing and clamping.

32. A linear guidance unit according to claim 1 or claim 23, characterised in that on the connecting face of the traveller (18) which is remote from the bottom wall (10a) there is a connecting member (20) which is of substantially T-shaped cross-section at right-angles to the longitudinal axis, being intended for fixing the first connection member, the said connecting member (20) having its middle web fixed to the traveller (18) while its transverse arms are closely adjacent the end faces (24) of the side walls (10b) which are remote from the bottom wall (10a).

33. A linear guidance unit according to claim 1 or claim 23, characterised in that the linear drive means comprises is a ball and worm drive (194, 196) with, extending in the longitudinal direction of the guide housing (110), a spindle (196) connected to a rotary drive and mounted in axially rigid and rotatable manner on the guide housing (10), and with, mounted on the traveller (18), a nut body (194) comprising an inner helical groove supplemented by a spindle (196) to constitute a helical ball race (198) and holding a number of endlessly rotating balls (202), a substantially axially extending ball return race (204) being housed in the nut body (194).

34. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), an axially parallel guide rail (12) mounted inside the guide cavity (32) and secured to at least one of said walls (10a, 10b), a traveller (18) guided to roll on the guide rail (12) and secured against tilting about the longitudinal axis, said traveller (18) being adapted to be connected through the longitudinal opening to a first connection member, linear drive means for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings engaging an axially parallel load-receiving track (48) in the traveler (18) and an axially parallel load-receiving track (44) in the guide rail (12) and a return row (46b) of rolling bearings and two arcuate rows (46c) of rolling bearings, said guide rail (12) being secured to said at least one wall (10a) by a plurality of bolts (14) extending through said at least one wall (10a) and anchored by an abutment rail (16) engaging an abutment face on the side of said at least one wall (10a) remote from said guide rail (12), said guide rail (12) and said abutment rail (16) being made of materials having substantially the same thermal expansion properties to minimize bimetallic effect therebetween, said at least one wall (10a) having thermal expansion properties different from those of said guide rail (12) and said abutment rail (16), said abutment rail (16) extending along substantially the total length of said guide rail (12), said guide rail (12) having a foot portion with a substantially planar bottom face and two substantially planar side faces (40), said foot portion being at least partially accommodated by a groove in said at least one wall (10a), said groove having a substantially planar bottom face and substantially planar side faces, said bottom face of said foot portion engaging said bottom face of said groove and said side faces of said foot portion engaging said side faces of said groove.

35. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), and further comprising an axially parallel guide rail (12) mounted inside the guide cavity (32) and on at least one of said walls (10a, 10b), a traveller (18) guided to roll on the guide rail (12) and secured against tilting about the longitudinal axis, the said traveller (18) being adapted to be connected through the longitudinal opening to a first connection member, linear drive means for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings engaging an axially parallel load-receiving track (48) in the traveller (18) and an axially parallel load-receiving track (44) in the guide rail (12) and a return row (46b) of rolling bearings and two arcuate rows (46c) of rolling bearings, on a connecting face of the traveller (18) remote from the bottom wall (10a) there being provided a connecting member (20) which is of substantially T-shaped cross-section at right-angles to the longitudinal axis, said connecting member being intended for fixing said first connection member, said connecting member (20) having a middle web fixed to the traveller (18) and having transverse arms closely adjacent respective end faces (24) of the side walls (10b) which are remote from the bottom wall (10a).

36. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), an axially parallel guide rail (12) mounted inside the guide cavity (32) and on at least one of these walls (10a, 10b), a traveller (18) guided to roll on the guide rail (12) and secured against tilting about the longitudinal axis, said traveller (18) being adapted to be connected through the longitudinal opening to a first connection member, linear drive means for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings, engaging an axially parallel load-receiving track (48) in the traveller (18) and an axially parallel load-receiving track (44) in the guide rail (12) and a return row (46b) of rolling bearings and two arcuate rows (46c) of rolling bearings, said linear drive means comprising flexible traction means (60) which, starting from the traveller (18), pass over jockey pulleys (56, 58) in the region of each of the two ends of the guide housing (10) and back to the traveller, and a middle strand (60b) of the flexible traction means (60) which extends from jockey pulley to jockey pulley and which is not connected to the traveller (18) extending outside the guide cavity (32).

37. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), an axially parallel guide rail (12) mounted inside the guide cavity (32) and on at least one of these walls (10a, 10b), a traveller (18) guided to roll on this guide rail (12) and secured against tilting about the longitudinal axis, said traveller (18) being adapted to be connected through the longitudinal opening to a first connection member, linear drive means for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings, engaging an axially parallel load-receiving track (48) in the traveller (18) and an axially parallel load-receiving track (44) in the guide rail (12) and a return row (46b) of rolling bearings and two arcuate rows (46c) of rolling bearings, said linear drive means comprising a flexible traction means (60) which, starting from the traveller (18), passes over jockey pulleys (56, 58) in the region of each of the two ends of the guide housing (10) and back to the traveller, and profile strips (28) engaging at least partially around edges of the portions (60a) of the flexible traction means (60), said edges being positioned axially between the traveller (18) and the jockey pulleys (56, 58) and spaced apart in the axial direction of these jockey pulleys (56, 58). Extending ball return race (204) being housed in the nut body (194), said traveller (118) comprising a web (18b) and two arms (18a) integrally combined therewith in a U-shaped manner, said web (18b) and said arms (18a) being adjacent to axially extending side faces of said guide rail (112), a connecting member (120) being separate from and fastened to said traveller (118) adjacent a side face of said web (18b) remote from said guide rail (112), said nut body (194) being accommodated within said connecting member (120), said connecting member (120) being at least partially accommodated within said guide cavity (32), and being adapted for connecting said first connection member with said traveller (118).

38. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), an axially parallel guide rail (12) mounted inside the guide cavity (32) and on at least one of these walls (10a, 10b), a traveller (18) guided to roll on this guide rail (12) and secured against tilting about the longitudinal axis, said traveller (18) being adapted to be connected through the longitudinal opening to a first connection member, linear drive means for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings engaging an axially parallel load-receiving track (48) in the traveler (18) and an axially parallel load-receiving track (44) in the guide rail (12) and a return row (46b) of rolling bearings and two arcuate rows (46c) of rolling bearings, said linear drive means comprising a ball and worm drive (194, 196) with, extending in the longitudinal direction of the guide housing (110), a spindle (196) connected to a rotary drive and mounted in an axially rigid and rotatable manner on the guide housing (10), and with, mounted on the traveller (18), a nut body (194) comprising an inner helical groove supplemented by a spindle (196) to constitute a helical ball race (198) and holding a number of endlessly rotating balls (202), a substantially axially extending ball return race (204) being housed in the nut body (194), said guide rail (112) being fastened to said bottom wall (10a), said traveller (118, 120) being U-shaped, with said traveller being provided with lubrication inflow means (188) for the lubrication of said rotating balls (202), said lubrication inflow means (188) being inside said guide cavity (32) adjacent to at least one of said side walls (10b), and at least one of said side walls (10b) being provided with an opening granting access to said lubrication inflow means (188).

39. A linear guidance unit, comprising an elongated guide housing (10) with a longitudinal axis and with, defining a guide cavity (32), a bottom wall (10a) and two side walls (10b), the two side walls (10b) forming between them, opposite the bottom wall (10a), a longitudinal opening in the guide cavity (32), an axially parallel guide rail (12) mounted inside the guide cavity (32) and on at least one of these walls (10a, 10b), a traveller (18) guided to roll on this guide rail (12) and secured against tilting about the longitudinal axis, said traveller (18) being adapted to be connected through the longitudinal opening to a first connection member, and further comprising a linear drive for propelling the traveller (18) in the direction of the longitudinal axis, at least two rolling bearing races (46) being disposed in the traveller (18) on opposite sides of the guide rail, each rolling bearing race (46) comprising a load-transmitting rectilinear row (46a) of rolling bearings engaging an axially parallel load-receiving track (48) in the traveler (18) and an axially parallel load-receiving track (44) in the guide rail (12) and a return row (46b) of rolling bearings and two arcuate rows (46c) of rolling bearings, said linear drive means comprising flexible traction means (60) which, starting from the traveller (18), pass over jockey pulleys (56, 58) in the region of each of the two ends of the guide housing (10) and back to the traveller, at least one of the jockey pulleys (56, 58) being accommodated in a jockey pulley housing (52, 54) which is disposed on an end face (72) of the guide housing (10) which is substantially at right-angles to the longitudinal axis, and at the junction between the guide housing (10) and the jockey pulley housing (52, 54) there is in the region of the longitudinal opening in the guide housing (10) a gasket (78) which co-operates with the flexible traction means (60).

* * * * *

UNITED STATES PATENT AND TRADEMARK OFFICE
CERTIFICATE OF CORRECTION

PATENT NO. : 4,934,835
DATED : June 19, 1990
INVENTOR(S) : Ernst Albert

It is certified that error appears in the above-identified patent and that said Letters Patent is hereby corrected as shown below:

ON TITLE PAGE: 3rd line of Abstract delete "means of";
Col. 4, line 52, delete "Ser.";
Col. 4, line 63, delete "Ser.";
Col. 4, line 66, delete "Ser.";
Col. 5, line 7, delete "Ser.";
Col. 5, line 49, delete "Ser.";
Col. 6, line 5, delete "Ser.";
Col. 6, line 16, delete "Ser."
Col. 6, line 29, delete "Ser."
Col. 10, line 46, delete "if";
Col. 11, line 28, "there,"
   should read --there--;
Col. 12, line 8, after "120"
   insert --, said connecting
   member (120)--;
Col. 15, delete lines 7 through 19.
Col. 10, line 37, "stand" should read --strand--.

Signed and Sealed this

Eighth Day of October, 1991

Attest:

HARRY F. MANBECK, JR.

*Attesting Officer*       *Commissioner of Patents and Trademarks*